United States Patent [19]

Moradian

[11] 3,754,942

[45] Aug. 28, 1973

[54] RUST PREVENTIVE COATING COMPOSITION

[76] Inventor: Ebrahim Moradian, 102 Windsor East, Thibodaux, La. 70301

[22] Filed: June 15, 1972

[21] Appl. No.: 263,292

Related U.S. Application Data

[63] Continuation-in-part of Ser. No. 113,087, Feb. 5, 1971, abandoned.

[52] U.S. Cl............... 106/14, 106/245, 106/246, 106/247, 117/134, 117/135
[51] Int. Cl............................................. C09d 5/08
[58] Field of Search................. 106/245, 246, 14, 106/253, 247; 117/134, 135

[56] References Cited
UNITED STATES PATENTS

| | | | |
|---|---|---|---|
| 3,565,843 | 3/1971 | Kassinger | 106/14 |
| 3,582,367 | 6/1971 | Miller et al. | 106/14 |

FOREIGN PATENTS OR APPLICATIONS

| | | | |
|---|---|---|---|
| 707,162 | 4/1954 | Great Britain | 106/14 |
| 800,590 | 8/1958 | Great Britain | 106/14 |
| 846,306 | 8/1960 | Great Britain | 106/14 |
| 1,019,662 | 2/1966 | Great Britain | 106/14 |

*Primary Examiner*—Allan Lieberman
*Attorney*—Harvey B. Jacobson

[57] ABSTRACT

A protective coating for metals is provided which is both resistant to corrosion and flexible. The protective coating comprises, by weight, about 10–60 percent of a high melting point micro crystalline wax, 2.5–25% of a mixture of paraffinic and naphthenic oils, 0.01–15% of an alkali metal sulfonate, 16–50 percent of an asphaltite, 2–25% of a drying oil, 2–5 percent of a high molecular weight naphthenic acid having an average molecular weight in the range from about 290 to 420, and 3–60 percent of a solvent. Metallic particles, such as aluminum paste and coloring agents can also be employed.

7 Claims, No Drawings

RUST PREVENTIVE COATING COMPOSITION

This application is a continuation-in-part of my earlier copending application, Ser. No. 113,087, filed Feb. 5, 1971, now abandoned.

This invention relates to a coating for preventing rust and corrosion on metallic surfaces. More specifically, the present invention relates to a composition for preventing rust and corrosion on metallic surfaces which is flexible, easy to apply, and permits the incorporation of various pigments and coloring matter into the coating.

It is known in the art to provide various coatings for metallic surfaces in order to inhibit rust and corrosion; however, these coatings have frequently had the disadvantage that they lack durability, do not readily adhere to the metallic surface, and do not permit the inclusion of various coloring materials. In particular, these coating compositions which have been known in the prior art have been susceptible to hardening and chipping when exposed to weather and severe atmospheric conditions for prolonged periods of time. Also, these surfaces have been generally susceptible to degradation when exposed to various strong chemical agents.

Accordingly, it is an object of the present invention to provide a novel coating composition to inhibit rust and corrosion on metallic surfaces.

It is a further object of the present invention to provide a coating composition for metallic surfaces which is flexible, durable, and permits the inclusion therein of various pigments and coloring materials.

It is yet a further object of the present invention to provide a coating composition which inhibits corrosion and rust on metallic surfaces and is further durable and resistant to attack by weathering and chemical agents.

These and other objects are accomplished according to the invention by providing a coating composition for metallic surfaces which comprises 10–60 weight percent of a high melting point micro crystalline wax; about 2.5–25 weight percent of a mixture of paraffinic and naphthenic oils; about 0.01–15 weight percent, preferably about 1–2 percent, of an oil soluble alkali metal sulfonate; about 16–50 weight percent of a naturally occurring asphaltite such as, for example, uintaite, commonly marketed under the name of Gilsonite; about 2–25 weight percent of a suitable drying oil, such as boiled linseed oil, and sufficient of a suitable solvent for the high melting point wax to solubilize the wax. Suitable solvents for use according to the present invention would be, for example, mineral spirits, xylol or toluol or mixtures thereof in amounts of about 3–60 weight percent. Most importantly the coating composition also includes 2–5 weight percent of a high molecular weight naphthenic acid to assist the coating to bond to the metal surface. In addition, the acid has been found to contribute to the composition remaining in suspension by discouraging settling of the asphaltite.

The high molecular weight naphthenic acid preferably has an average molecular weight in the range from about 290 to about 420. A suitable acid having the desired properties is available from the Sun Oil Company under the name Sunaptic Acid. Sunaptic Acids are commercially available in three molecular weight ranges, A, B and C, all of which are suitable for use in the present coating composition individually or in admixture. Some typical properties of the high molecular weight naphthenic acids as exemplified by the Sunaptic Acids are set forth in Table I.

TABLE I

| | SUNAPTIC ACIDS | | |
|---|---|---|---|
| | A | B | C |
| Acid No., mg KOH/gram | 178 | 159 | 122 |
| Unsaponifiables, wt % | 5.6 | 6.3 | 9.1 |
| Density 4/20 | 0.988 | 0.987 | 0.992 |
| Viscosity, S.U.S./210 F | 106 | 159 | 624 |
| Bromine No. | 10.0 | 10.7 | 12.1 |
| Refractive Index 20 $N_D$ | 1.498 | 1.503 | 1.516 |
| Pour Point, F | 25 | 40 | 75 |
| Average Molecular Weight of Deoiled Acids | 297 | 330 | 415 |
| Average Molecular Formula | $C_{19}H_{34}O_2$ | $C_{21}H_{37}O_2$ | $C_{27}H_{49}O_2$ |
| Average Type Formula | $C_nH_{2n-4}O_2$ | $C_nH_{2n-5}O_2$ | $C_nH_{2n-7}O_2$ |
| Distillation Range, F at 2mm Hg | | | |
| Initial | 315 | 287 | 408 |
| 5 | 329 | 330 | 427 |
| 10 | 337 | 352 | 446 |
| 20 | 345 | 370 | 466 |
| 30 | 341 | 380 | 483 |
| 40 | 354 | 392 | 496 |
| 50 | 365 | 405 | 509 |
| Distillation Range, F at 2mm Hg | | | |
| 60 | 374 | 422 | 523 |
| 70 | 387 | 438 | 535 |
| 80 | 405 | 460 | 548 |
| 90 | | 490 | 4580 |
| 95 | | 510 | |
| E.P. | 485 | 530 | 596 |
| Recovery, % | 95 | 98 | 95 |

The micro crystalline wax employed according to the present invention serves as the primary coating agent and should have a relatively high melting point sufficient to withstand high temperature without softening, for example, of about 150°–160°F.

The alkali metal sulfonate which is employed according to the present invention should have a molecular weight of about 400–550. These alkali metal sulfonates, which preferably are sodium sulfonates, serve in the composition of the present invention as both a pigment dispersing agent and a rust and corrosion preventive soluble oil.

The mixture of paraffinic and naphthenic oils employed according to the present invention can consist of about 5–95 percent of the paraffin oil and about 95–5 percent of the naphthenic oil with approximately equal proportions of the two oils being preferred. The paraffinic oil being employed according to the present invention is a highly saturated and, therefore, oxidation resistant oil having a predominate number of paraffinic side chains, i.e., at least about 55 percent paraffinic carbon atoms, API gravities at 60°F of about 28.5–31 and pour point of 0°F. In general, these paraffin oils also contain at least about 80 percent saturates and between 14 and 20 percent aromatics. The naphthenic oils employed according to the present invention are characterized by containing large numbers of naphthene rings (30–45 percent naphthenic carbon atoms), pour point of about −50°F, API specific gravities at 60°F of about 24–28 and molecular weight of about 200–300. They should also possess color stability.

The asphaltite employed according to the present invention is important in order that the protective finish will dry to a hard flexible finish. When less than about 16 weight percent of the asphaltite is employed in the composition of the present invention, the result is that the finish requires a longer period of time to cure, for example, over 24 hours. About 20–25 weight percent asphaltite has been found to give good drying times according to this invention with optimum drying times realized when about 40–50 weight percent asphaltite is employed. If no asphaltite is used, it has been found that the wax base protective coating of the invention will not dry at all and is therefore unsatisfactory.

It is of importance that the following steps and sequence of procedures be employed in order to obtain a satisfactory coating composition according to the present invention. First, the micro crystalline wax is melted and the following ingredients added in the proper proportions in the indicated sequence: a drying oil such as mineral spirits, boiled linseed oil or process marine oil; paraffinic oil; and the high molecular weight naphthenic acid. The oil soluble sulfonate and naphthenic oil are then mixed together and added to the micro crystalline wax containing mixture. Finally, the asphaltite is dissolved in the solvent (e.g., toluol or xylol) and added to the composition. It has been found that the proportion ranges set forth for the micro crystalline wax, the asphaltite and the sodium sulfonate components strongly influence the properties of the resulting composition. To a lesser extent, the composition is also influenced by the amount of naphthenic/paraffinic oil and drying oil present. However, satisfactory compositions can be formulated despite minor deviations from the prescribed ranges of these oils. At least 2 percent high molecular weight naphthenic acid is necessary for proper adherence of the coating to the underlying surface; more than 5 percent is uneconomical and serves no useful purpose.

Application to the metallic surface can be by any of the conventional procedures such as spraying or painting. No priming of the surface is required before application.

Various colors can also be provided by including the appropriate tint to the coating composition. Where, however, metallic colors are used, application of the coating must be by spraying.

The composition of this invention can also be modified by adding aluminum paste of both leafing and non-leafing type. This addition improves the hardness and also helps the stability of the product. Also, by addition of the aluminum paste to the composition, a variety of different colorants can be added to the finish which is not otherwise possible. Suitable amounts of aluminum paste are from 0.25 lb to 4 lbs per gallon of composition with about 2.5 lbs per gallon being preferred.

To illustrate the composition of the present invention and to point out the criticality of certain of the proportion ranges, a number of compositions were prepared and tested, and are set forth in the following examples.

EXAMPLE I

With reference to Table II, test samples were prepared having the compositions set forth in columns 1–3. Samples 1 and 3 utilized Grades A and C of Sunaptic Acid, respectively. Sample 2 utilized a mixture of Grades A, B and C.

Inasmuch as the test samples did not contain any sodium sulfonate, corrosion of the underlying metal surface occurred within a short time.

EXAMPLE II

With reference to Table II, test samples were prepared having the compositions set forth in columns 4 and 5. Sample 4 utilized Grade B of Sunaptic Acid while Sample 5 was prepared from a mixture of Grades A, B and C.

Sample 4 contained insufficient asphaltite and did not cure properly. Sample 5 contained no asphaltite and never hardened to an acceptable finish.

EXAMPLE III

With reference to Table II, test samples were prepared having the compositions set forth in columns 7, 10 and 11. Sample 7 contained Grade A Sunaptic Acid. Samples 10 and 11 contained mixtures of Grades A, B and C. Each of these samples contained less than 10% micro crystalline wax and were observed to be deficient in terms of flexibility and ability to withstand atmospheric conditions.

EXAMPLE IV

With reference to Table II, test samples were prepared having the compositions set forth in columns 6, 8, 9 and 12–15. Samples 6 and 12–15 utilized mixtures of Grades A, B and C of Sunaptic Acid. Sample 8 was prepared and tested with each of Grades A, B and C and Sample 9 with each of Grades A and B. Each of the aforementioned compositions cured within 24 hours, was flexible and resisted chipping under even severe conditions of temperature and weathering.

While the present invention has been described with respect to particular embodiments thereof, it will be understood that numerous modifications may be made by those skilled in the art without actually departing from the scope of the invention.

TABLE II.—EXAMPLES (WEIGHT PERCENT)

| Component | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Microcrystalline wax (M.P. 160° F.) | 18.1 | 14.6 | 20.67 | 17.0 | 12.0 | 13.67 | 6.12 | 32.67 | 40.0 | 2.0 | 2.0 | 13.67 | 13.67 | 13.67 | 13.67 |
| Sunaptic acid | 3.9 | 2.06 | 2.99 | 3.9 | 4.2 | 2.06 | 2.06 | 2.06 | 2.06 | 4.2 | 4.2 | 2.06 | 2.06 | 2.06 | 2.06 |
| Naphthenic oil (API gravity 26.4 at 60° F.; 44% naphthenic carbon atoms) | .93 | .042 | 0.42 | .93 | .93 | .042 | 1.02 | 1.42 | .042 | .93 | .93 | 5.42 | 11.24 | 7.09 | 9.24 |
| Paraffinic oil (API gravity of 29 at 60° F.; 58% paraffinic carbon atoms) | 1.65 | 1.4 | 1.4 | 1.65 | 1.65 | 1.40 | 2.92 | 2.92 | 2.92 | 1.65 | 1.65 | 8.09 | 13.68 | 10.52 | 14.24 |
| Xylol | 64.4 | | | | | | 31.57 | | | | | | | | |
| Asphaltite (Gilsonite) | 9.0 | 31.76 | 24.76 | 9.0 | | 31.76 | 50.12 | 16.61 | 16.0 | 23.09 | 23.1 | 31.0 | 25.12 | 29.0 | 29.12 |
| Boiled linseed oil | 2.0 | 2.62 | 2.62 | 2.00 | 5.0 | 2.62 | | 2.62 | 1.62 | 20.0 | 25.0 | 2.62 | 2.62 | 2.62 | 2.62 |
| Oil soluble sodium sulfonate (molecular wt. 515) | | | | 1.12 | 6.0 | .93 | 1.96 | 1.96 | 1.96 | 15.0 | 12.6 | .93 | .93 | .93 | .93 |
| Toluol | | 40.3 | 40.3 | 64.4 | 58.2 | 40.3 | | 36.63 | 15.02 | 30.13 | 27.5 | 34.2 | 28.68 | 32.11 | 26.12 |
| Mineral spirit | | 6.84 | 6.84 | | 12.0 | 6.84 | 3.11 | 3.11 | | 3.0 | 3.0 | 2.00 | 2.00 | 2.00 | 2.00 |
| Process marine oil | | | | | | | 1.12 | | | | | | | | |

What is claimed as new is as follows:

1. A coating composition for metallic surfaces which comprises about 10–60 weight percent micro crystalline wax having a melting point of at least about 150°F, 2.5–25 weight percent of a mixture of naphthenic and paraffinic oils, said mixture comprising about 5–95 weight percent of a paraffinic oil which has at least about 55 percent paraffinic carbon atoms, an API gravity at 60°F of about 28.5–31 and a pour point of 0°F and about 95–5 weight percent of a naphthenic oil having about 30–45 percent naphthenic carbon atoms, an API gravity at 60°F of about 24–28, a pour point of about −50°F and a molecular weight of about 200–300, 0.01–15 weight percent of an oil soluble alkali metal sulfonate having a molecular weight of about 400–550, 16–50 weight percent of unitaite, 2–25 weight percent of boiled linseed oil, 2–5 weight percent of a high molecular weight naphthenic acid having an average molecular weight in the range of from about 290 to 420 and about 3–60 weight percent of a solvent selected from the group consisting of mineral spirit, xylol, toluol and mixtures thereof.

2. The coating composition of claim 1 wherein said alkali metal sulfonate is sodium sulfonate.

3. The composition of claim 1 wherein said micro crystalline wax has a melting point of about 150°–160°F, said alkali metal sulfonate is sodium sulfonate and said solvent is toluol.

4. The composition of claim 1 which includes sufficient coloring matter to impart a desired tint to the coating.

5. The composition of claim 3 which includes sufficient coloring matter to impart a desired tint to the coating.

6. A metallic surface having applied thereto a coating composition comprising about 10–60 weight percent micro crystalline wax having a melting point of at least about 150°F, 2.5–25 weight percent of a mixture of naphthenic and paraffinic oils, said mixture comprising about 5–95 weight percent of a paraffinic oil which has at least about 55 percent paraffinic carbon atoms, an API gravity at 60°F of about 28.5–31 and a pour point of 0°F and about 95–5 weight percent of a naphthenic oil having about 30–45 percent naphthenic carbon atoms, an API gravity at 60°F of about 24–28, a pour point of about −50°F and a molecular weight of about 200–300, 0.01–15 weight percent of an oil soluble alkali metal sulfonate having a molecular weight of about 400–550, 16–50 weight percent of unitaite, 2–25 weight percent of boiled linseed oil, 2–5 weight percent of a high molecular weight naphthenic acid having an average molecular weight in the range of from about 290 to 420 and about 3–60 weight percent of a solvent selected from the group consisting of mineral spirits, xylol, toluol and mixtures thereof.

7. A metallic surface, as claimed in claim 6, wherein said micro crystalline wax has a melting point of about 150°–160°F, said alkali metal sulfonate is sodium sulfonate and said solvent is toluol.

* * * * *